United States Patent Office 2,895,907
Patented July 21, 1959

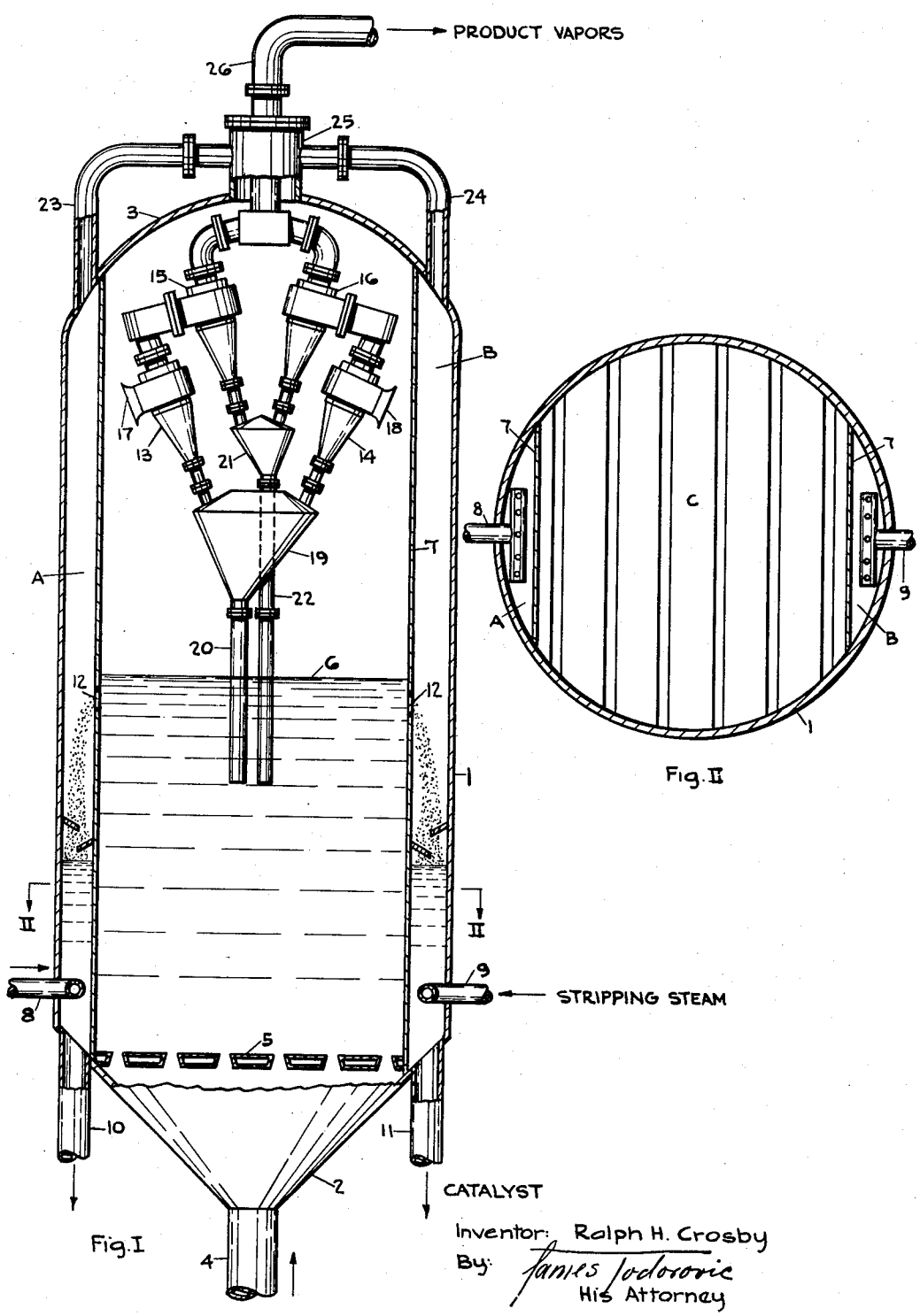

2,895,907

CATALYTIC CRACKING OF HYDROCARBONS WITH RECYCLING OF THE STRIPPING VAPORS

Ralph H. Crosby, Jackson Heights, N.Y., assignor to Shell Development Company, Emeryville, Calif., a corporation of Delaware Application June 15, 1953, Serial No. 361,632

3 Claims. (Cl. 208—150)

This invention relates to an improvement in the catalytic cracking of hydrocarbon oils using the so-called fluidized catalyst technique. More particularly, the invention relates to the catalytic cracking of hydrocarbon oils in fluidized catalyst reactors of the so-called downflow type.

The application of powdered catalyst by the fluidized catalyst technique is widely used and well known. Its widest application is in the catalytic cracking of hydrocarbon oils. In this application so-called downflow reactors are used. In downflow type reactors, sometimes also called bottom draw-off reactors, the finely divided catalyst is retained in the so-called fluidized (pseudo liquid) state in the reaction vessel; the oil to be cracked is injected into the bottom of the bed of catalyst and the rising vapors serve to maintain the desired dense phase, free flowing, condition of the catalyst. Hot freshly regenerated catalyst is continuously added to the fluidized catalyst bed to retain the desired catalytic activity and to supply heat and a like amount of partially spent catalyst is continuously removed from the bed to retain a substantially constant volume of catalyst in the reactor. This catalyst is withdrawn in a dense fluidized state by gravity flow separate from the hydrocarbon product vapors which are withdrawn overhead; hence, the designation downflow or bottom draw-off reactor. In downflow fluidized catalyst reactors, it is of considerable importance to prevent the powdered catalyst from passing out overhead in suspension in the effluent vapors. A considerable space is, therefore, provided above the bed of the fluidized catalyst which space is called the disengaging space. In this space, due to the low gas velocity, part of the suspended powdered catalyst settles out of the rising hydrocarbon vapors. This is, however, entirely not enough and, consequently, cyclone separators are provided to remove further amounts of catalyst particles from the effluent vapors. The cyclone separators used are of the conventional type wherein the vapors carrying some suspended catalyst enter through the cylindrical outer shell tangentially into an annular space between the cyclone shell and a central cylindrical exit line. In order to prevent very rapid erosion of the cyclone separators, it is essential that the linear velocity of the gas entering the cyclone be held quite low. Under these conditions, a large cyclone separator is very inefficient and the efficiency increases as the size of the cyclone separator is decreased. Consequently, it is the universal practice to provide a number of such cyclone separators in parallel, the number usually being between 3 and 6, depending upon the size of the catalytic cracking plant. Even this arrangement is not generally satisfactory and it is the usual practice to provide a second stage cyclone separator for each primary cyclone separator, thus making the total number of cyclone separators from 6 to 12. For practical reasons, the cyclone separators are placed within the reactor vessel in the disengaging space, and the effluent vapors from the separate last stage cyclones are led by suitable conduits to a central top vapor outlet line which is the vapor outlet of the reactor vessel proper. The cyclone assembly is, consequently, quite large and complicated and takes up a large part of the available space in the upper part of the reactor vessel.

The partially spent catalyst, withdrawn from the fluidized bed of catalyst in the reactor as described, contains appreciable amounts of adsorbed and occluded hydrocarbons. In order to prevent loss of this material, and also for other reasons, it is the practice to strip this catalyst of some of these hydrocarbons with steam. This is carried out in a so-called stripping zone which may be within the reactor vessel or in a separate vessel. The stripping zone is generally located within the reactor vessel. Thus steam, after passing up through the catalyst in the stripping zone, commingles with the hydrocarbon vapors issuing from the catalyst bed in the reaction section. Catalyst carried in suspension in the stripping steam is, therefore, allowed to settle in the disengaging space and further amounts are removed in the mentioned cyclone separators. With this arrangement only one set of cyclone separators is required.

The gasoline obtained in catalytic cracking is much superior to that obtained by thermal (pyrolitic) cracking. Consequently, it is desirable to avoid conditions conductive to non-catalytic (thermal cracking) as far as possible. I have noted that in commercial catalytic cracking plants, such as described, an appreciable amount of thermal cracking and undesirable side reactions take place in the disengaging space, particularly in the considerable space above the cyclone inlets. In order to avoid this condition, I modify the reactor and stripper design so that the stripping steam, after passing through the catalyst in the stripping step, is passed downwardly over the tops of the cyclones rather than to allow it to commingle with the hydrocarbon vapors as they issue from the catalyst bed. With this arrangement, the gases flowing into the cyclone inlets approach the inlets from both the upward and downward direction. Since the partial pressure of hydrocarbons in the stripping steam is quite low, the overall effect is to eliminate the hitherto unused space above the cyclone inlets and to thereby eliminate the thermal cracking and secondary reactions which normally take place in that space without decreasing the efficiency of the lower part of the disengaging space below the cyclone inlets. In fact, the efficiency of this space is improved since the gas velocity is reduced and this allows more rapid settling.

My invention will be further described with reference to a specific example in which reference will be made to the accompanying drawing.

Figure I illustrates semi-diagrammatically and in vertical section a fluidized catalyst catalytic cracking reactor modified to embody the features of my invention.

Figure II is a horizontal sectional view of the reactor taken through the plane II—II.

Referring to the drawing, the reactor comprises a cylindrical shell 1 provided with top and bottom closures 2 and 3. In the case illustrated the vessel has straight sides. It may, however, be swedged to a larger diameter near the top if desired. Hydrocarbon oil to be cracked is introduced by the riser line 4 entering the bottom of the conical bottom closure. A grid member 5 is provided near the top of the conical section to cause the incoming vapors to distribute evenly over the cross-section of the reaction zone. In the case illustrated, fresh catalyst is carried into the reactor in suspension in the incoming hydrocarbon vapors. The fresh catalyst may, if desired, however, be introduced in other ways. The finely divided cracking catalyst is retained in the reactor as a fluidized bed having a level indicated at 6. The space above this level is the so-called disengaging space.

Referring to Figure II, it is seen that partitions 7 are extended as chords across the circumference of the vessel thereby creating two stripping zones A and B on either side of the large reaction zone C. The grid extends only over the cracking section C. Steam distributing lines 8 and 9 are provided in the bottom of the stripping sections A and B. The steam introduced by these lines is used to strip the catalyst leaving the reactor by standpipes 10 and 11.

Referring to Figure I, the partitions 7 extend from the bottom up to a point below the level of the fluidized bed. Second partitions similar to partitions 7 extend from the top of the vessel down to below the level of the fluidized bed. A small gap of suitable width is left between the ends of the partitions to allow the catalyst to flow from the reaction section into the stripping sections. Thus, the stripping vapors passing up through the stripping zones are sealed against entry into the disengaging space above the reaction zone C. In place of a continuous gap between the ends of the partitions, the partitions may be joined leaving suitable openings 12 for the flow of catalyst.

The cyclone separators in the disengaging space of the vessel are quite complicated and difficult to illustrate. They are, therefore, generally indicated in a much simplified and diagrammatic form. The cyclone separator arrangement shown in the accompanying drawing is likewise somewhat simplified but the general arrangement and dimensons were taken from engineering drawings and are shown as accurately as possible. It will be understood that only two first-stage cyclone separators 13 and 14 and two second-stage cyclone separators 15 and 16 are shown whereas there are actually six such sets of cyclone separators with their interconnecting manifolding lines. The actual distance between the level 6 and the entrances 17 and 18 of the cyclone separators is about 14 feet. The distance between the entrances of the cyclone separators and the top of the reactor shell is about 16 feet. The catalyst separated in the first stage cyclone separators is collected in the hopper 19 from which it is returned to the catalyst bed by dip leg 20. The catalyst separated by the second-stage cyclone separators is collected in the hopper 21 from which it is returned to the catalyst bed by dip leg 22. The cyclone separator assembly is suspended from the upper closure by suitable supports (not shown) and a catwalk (also not shown) is provided for inspection and maintenance but these are not features of the invention.

Referring to Figure I, it is seen that lines 23 and 24 are provided for withdrawing the stripping gases (mostly steam) from the upper sections of the two stripping zones. These lines pass into a small dome 25 surrounding the reactor product line 26 which is the common exit line for the vaporous effluents of the several second-stage cyclone separators. The stripping vapors are, therefore, forced to pass through lines 23 and 24 before entering the disengaging space of the reactor. The stripping steam must then flow downwardly to the cyclone inlet openings 17 and 18 before being discharged from the system. Catalyst carried in suspension in the spent stripping steam is separated in the cyclone separators along with the separation of catalyst from the effluent hydrocarbon vapors. The hydrocarbon product vapors and the spent stripping steam then pass out of the system substantially free of suspended catalyst by the reactor product line 26.

While I have described a preferred embodiment of my invention, it is to be understood that modifications may be made the essential feature being that the stripping steam, after being used to effect stripping of the spent catalyst, is caused to pass downwardly over the cyclone separator assembly to the cyclone entrance ports and then through the cyclone separators to remove suspended catalyst particles before its discharge from the system in admixture with the vaporous hydrocarbon products. Since this stripping steam moves downwardly to the cyclone inlet ports, hydrocarbon vapors rising from the fluidized catalyst bed towards the same cyclone inlet ports are effectively prevented from occupying the space above the cyclone inlet ports.

I claim as my invention:

1. In the catalytic cracking of hydrocarbon oil in a fluidized bed of cracking catalyst in a cracking zone above which is a disengaging space to allow suspended catalyst to settle from the ascending vaporous hydrocarbon products, and in which the vaporous hydrocarbon products leave said disengaging space through a plurality of centrifugal separation zones within said disengaging space, and wherein partially spent catalyst is continuously withdrawn from said reaction zone and separately stripped with steam prior to regenerating it, the improvement which comprises retaining the vapors comprising a mixture of gas, oil vapors, and steam from said stripping step including suspended catalyst separate from the vaporous hydrocarbon reaction product while conveying the former to a point above the level of said centrifugal separation zones and then discharging them at said point into said disengaging space in such a manner that they flow unobstructed downward to and then through said same centrifugal separation zones whereby the said stripping vapors are withdrawn from the system substantially free of suspended catalyst particles along with the hydrocarbon product vapors as the vaporous effluent of said centrifugal separation zones.

2. In the catalytic cracking of hydrocarbon oil in a fluidized bed of cracking catalyst in a cracking zone above which is a disengaging space to allow suspended catalyst to settle from the ascending vaporous hydrocarbon products, and in which the vaporous hydrocarbon products leave said disengaging space through a plurality of centrifugal separation zones within said disengaging space, and wherein partially spent catalyst is continuously withdrawn from said reaction zone and separately stripped with steam prior to regenerating it, the improvement which comprises retaining the vapors comprising a mixture of gas, oil vapors, and steam from said stripping step including suspended catalyst separate from the vaporous hydrocarbon reaction product while conveying the former to a point above the level of said centrifugal separation zones and then discharging them at said point into said disengaging space in such a manner that they flow unobstructed downward to and then through said same centrifugal separation zones whereby the upper part of said disengaging space above said centrifugal separation zones is occupied by downwardly moving stripping vapors whereas the lower part of said disengaging space below said centrifugal separation zones is occupied by rising vaporous hydrocarbon reaction product and the said stripping vapors are withdrawn from the system substantially free of suspended catalyst particles along with the hydrocarbon product vapors as the vaporous effluent of said centrifugal separation zones.

3. In the catalytic cracking of hydrocarbon oil in a fluidized bed of cracking catalyst in a cracking zone above which is a disengaging space to allow suspended catalyst to settle from the ascending vaporous hydrocarbon products, and in which the vaporous hydrocarbon products leave said disengaging space through a plurality of centrifugal separation zones within said disengaging space, and wherein partially spent catalyst is continuously withdrawn from said reaction zone and separately stripped with steam prior to regenerating it, the improvement which comprises retaining the vapors comprising a mixture of gas, oil vapors, and steam from said stripping step including suspended catalyst separate from the vaporous hydrocarbon reaction product while conveying the former to a point above the level of said centrifugal separation zones and then discharging them at said point into said disengaging space in such a manner that they flow unobstructed downward to and then through said same centrifugal separation zones whereby the said stripping vapors moving downward countercurrent to the rising vaporous hydrocarbon reaction product are withdrawn from the system substantially free of suspended catalyst particles along with the hydrocarbon product vapors as the vaporous effluent of said centrifugal separation zones.

References Cited in the file of this patent

UNITED STATES PATENTS

| | | |
|---|---|---|
| 2,446,678 | Voorhees | Aug. 10, 1948 |
| 2,615,796 | Peet | Oct. 28, 1952 |
| 2,688,588 | Beam | Sept. 7, 1954 |
| 2,706,704 | Squires | Apr. 19, 1955 |
| 2,726,197 | Ewell | Dec. 6, 1955 |